United States Patent
Hercock

(10) Patent No.: US 12,267,337 B2
(45) Date of Patent: Apr. 1, 2025

(54) FEATURE DETECTION WITH NEURAL NETWORK CLASSIFICATION OF IMAGES REPRESENTATIONS OF TEMPORAL GRAPHS

(71) Applicant: BRITISH TELECOMMUNICATIONS PUBLIC LIMITED COMPANY, London (GB)

(72) Inventor: Robert Hercock, London (GB)

(73) Assignee: British Telecommunications Public Limited Company United (GB)

( * ) Notice: Subject to any disclaimer, the term of this patent is extended or adjusted under 35 U.S.C. 154(b) by 586 days.

(21) Appl. No.: 17/593,626

(22) PCT Filed: Mar. 18, 2020

(86) PCT No.: PCT/EP2020/057531
§ 371 (c)(1),
(2) Date: Sep. 21, 2021

(87) PCT Pub. No.: WO2020/193331
PCT Pub. Date: Oct. 1, 2020

(65) Prior Publication Data
US 2022/0255953 A1    Aug. 11, 2022

(30) Foreign Application Priority Data

Mar. 23, 2019    (EP) .................................... 19164779

(51) Int. Cl.
*H04L 9/40* (2022.01)
*G06F 16/901* (2019.01)
(Continued)

(52) U.S. Cl.
CPC ...... *H04L 63/1416* (2013.01); *G06F 16/9024* (2019.01); *G06F 18/29* (2023.01);
(Continued)

(58) Field of Classification Search
CPC . H04L 63/1416; H04L 41/16; H04L 63/1425; H04L 63/1441; G06F 16/9024; G06F 18/29; G06V 10/457; G06V 10/82
See application file for complete search history.

(56) References Cited

U.S. PATENT DOCUMENTS

2010/0277481 A1   11/2010   Cao et al.
2013/0326625 A1*  12/2013   Anderson ............. G06F 21/566
                                                    726/23
(Continued)

FOREIGN PATENT DOCUMENTS

EP            3255586 A1     12/2017
WO     WO-2016146610 A1 *    9/2016  ........... G06F 17/141

OTHER PUBLICATIONS

"Combined Search and Examination Report under Sections 17 and 18(3) for Great Britain Application No. GB1904020.3, mailed on Sep. 12, 2019".
(Continued)

Primary Examiner — Esther B. Henderson
(74) Attorney, Agent, or Firm — EIP US LLP

(57) ABSTRACT

A computer implemented method of feature detection in temporal graph data structures of events, the method including receiving a temporal series of graph data structures of events each including a plurality of nodes corresponding to events and edges connecting nodes corresponding to relationships between events; rendering each graph data structure in the series as an image representation of the graph data structure including a representation of nodes and edges in the graph being rendered reproducibly in a cartesian space based on attributes of the nodes and edges, so as to generate a temporal series of image representations ordered according to the temporal graph data structures; processing the series of image representations by a convolutional neural network to classify the image series so as to identify a feature in the
(Continued)

image series, the convolutional neural network being trained by a supervised training method including a plurality of training example image series in which a subset of the training examples are classified as including the feature.

10 Claims, 2 Drawing Sheets

(51) Int. Cl.
 *G06F 18/20* (2023.01)
 *G06V 10/44* (2022.01)
 *G06V 10/82* (2022.01)
 *H04L 41/16* (2022.01)

(52) U.S. Cl.
 CPC ............ *G06V 10/457* (2022.01); *G06V 10/82* (2022.01); *H04L 41/16* (2013.01); *H04L 63/1425* (2013.01); *H04L 63/1441* (2013.01)

(56) References Cited

U.S. PATENT DOCUMENTS

| | | | | |
|---|---|---|---|---|
| 2017/0221240 | A1 | 8/2017 | Stetson et al. | |
| 2018/0115567 | A1 | 4/2018 | El-moussa et al. | |
| 2019/0042745 | A1* | 2/2019 | Chen | G06V 20/62 |
| 2019/0130578 | A1* | 5/2019 | Gulsun | G06N 3/045 |
| 2019/0147125 | A1* | 5/2019 | Yu | G06F 30/20 |
| | | | | 703/10 |

OTHER PUBLICATIONS

"Extended European Search Report for Application No. 19164779.1, mailed on Sep. 12, 2019".

"International Preliminary Report on Patentability for Application No. PCT/EP2020/057531, mailed on Oct. 7, 2021".

"International Search Report and Written Opinion received for PCT Patent Application No. PCT/EP2020/057531, mailed on May 19, 2020".

Deng L., et al., "Deep Learning: Methods and Applications", Foundations and Trends R in Signal Processing, vol. 7, No. 3-4 (2013), 2014, pp. 197-387.

Graves A., et al., "Speech Recognition With Deep Recurrent Neural Networks", Department of Computer Science, University of Toronto, arXiv:1303.5778v1, Mar. 22, 2013, 5 pages.

Hohman F., et al., "Visual Analytics in Deep Learning: An Interrogative Survey for the Next Frontiers", arXiv:1801.06889v3, May 14, 2018, 20 pages.

Mnih V., et al., "Playing Atari with Deep Reinforcement Learning", DeepMind Technologies, arXiv:1312.5602v1, Dec. 19, 2013, 9 pages.

Niepert M., et al., "Learning Convolutional Neural Networks for Graphs", Proceedings of the 33 rd International Conference on Machine Learning, New York, NY, USA, 2016. JMLR: W&CP vol. 48, arXiv: 1605.05273v4 [cs.LG], Jun. 8, 2016, 10 pages.

O'Shea K., et al., "An Introduction to Convolutional Neural Networks", arXiv:1511.08458v2, Dec. 2, 2015, 11 pages.

Polson, N. G., "Deep Learning for Short-Term Traffic Flow Prediction", Systems Engineering and Operations Research, George Mason University, arXiv:1604.04527v3, Feb. 27, 2017, 29 pages.

Saha S., "A Comprehensive Guide to Convolutional Neural Networks—theELI5 Way", Retrieved from https://towardsdatascience.com/a-comprehensive-guide-to-convolutional- neural-networks-the-eli5-way-3bd2b1164a53, Dec. 15, 2018, 13 pages.

Silver D., et al., "AlphaGo: Mastering the Ancient Game of Go with Machine Learning", Google AI Blog, Jan. 27, 2016, 4 pages.

Silver D., et al., "Mastering the Game Of Go with Deep Neural Networks and Tree Search", Nature, vol. 529, Jan. 28, 2016, 20 pages.

Wikipedia, "Poincare Map", Retrieved from https://en.wikipedia.org/wiki/Poincar%C3%A9_map, Dec. 7, 2016, 3 pages.

Wistuba M., et al., "Move Prediction in Go—Modelling Feature Interactions Using Latent Factors", University of Hildesheim Information Systems & Machine Learning Lab, 2013, 12 pages.

Zhou Z., et al, "Convolution on Graph: A High-Order and Adaptive Approach", Association for the Advancement of Artificial Intelligence, arXiv:1706.09916v2, Oct. 20, 2017, 8 pages.

"Graph (abstract data type)," Wikipedia, available at https://en.wikipedia.org/wiki/Graph_(abstract_data_type) as of Sep. 26, 2024, 5 pgs.

\* cited by examiner

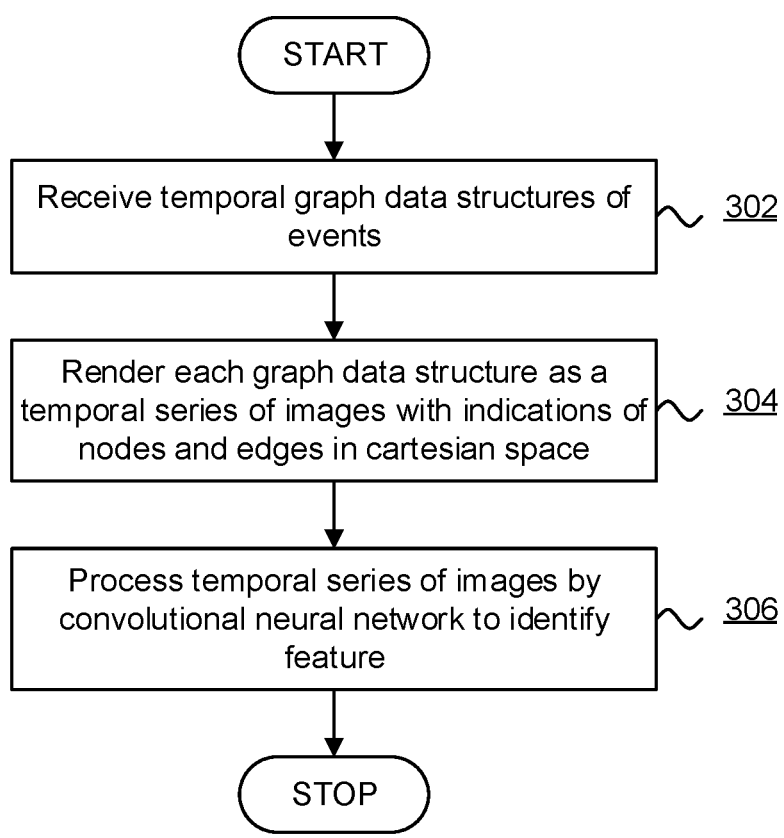

FEATURE DETECTION WITH NEURAL NETWORK CLASSIFICATION OF IMAGES REPRESENTATIONS OF TEMPORAL GRAPHS

PRIORITY CLAIM

The present application is a National Phase entry of PCT Application No. PCT/EP2020/057531, filed Mar. 18, 2020, which claims priority from EP Patent Application No. 19164779.1, filed Mar. 23, 2019, each of which is hereby fully incorporated herein by reference.

TECHNICAL FIELD

The present disclosure relates to the detection of features in temporal series of graph data structures.

BACKGROUND

Graph data structures are commonly used to represent and model events in contexts such as, inter alia, computer networks, telecommunications, software, defense and security, bio-informatics and large-scale sensor networks such as sensors found in internet-of-things (IOT) environments. Graph representations of events can provide a useful basis for identifying occurrences warranting intervention. For example, a graph representation of network communication can be used to detect malicious activity in a network.

Typical automated graph analytical processes are resource intensive as a number of elements within a graph grows. Thus, for increased graph dimensionality including numbers of nodes and edges, a quantity of resource required for processing such graphs, such as computer processing, memory and bandwidth resource, can increase considerably. Such typical analytical processing can include, inter alia: graph walking; clustering; sub-graph analysis and classification methods. The problem is considerably compounded if graphs are generated over time as a temporal series of graphs modelling event occurrences in a system, whereby a number of graphs increases dramatically with a consequently dramatic increase in analytical computing resource.

Thus, there is a challenge in providing improved feature detection for graph data structures that alleviates the aforementioned challenges.

SUMMARY

According to a first aspect of the present disclosure, there is a provided a computer implemented method of feature detection in temporal graph data structures of events, the method comprising: receiving a temporal series of graph data structures of events each including a plurality of nodes corresponding to events and edges connecting nodes corresponding to relationships between events; rendering each graph data structure in the series as an image representation of the graph data structure including a representation of nodes and edges in the graph being rendered reproducibly in a cartesian space based on attributes of the nodes and edges, so as to generate a temporal series of image representations ordered according to the temporal graph data structures; processing the series of image representations by a convolutional neural network to classify the image series so as to identify a feature in the image series, the convolutional neural network being trained by a supervised training method including a plurality of training example image series in which a subset of the training examples are classified as including the feature.

In some embodiments, rendering a graph reproducible in the cartesian space includes determining, for each of node and edge elements in the graph: a size of an indication of the element; a location in the space of the element; and visible attributes of the indication of the element in the space, so as to render the indication having the size, at the location and with the visible attributes.

In some embodiments, the visible attributes include one or more of: a greyscale; a color; and a brightness.

In some embodiments, the feature is an indication of a subgraph in the image series.

In some embodiments, the feature includes a particular change or series of changes to a subgraph over images in the temporally ordered image series.

In some embodiments, the events include network communication events for communication across a computer network, and wherein the feature is associated with malicious communication in the network.

In some embodiments, the identification of the feature in the image series indicates the existence of malicious communication in the network, and the method further comprises, responsive to the identification of the feature in the image series, deploying one or more of: network security protective measures; and network intrusion remediative measures in the computer network.

In some embodiments, the network security protective measures include one or more of: a network proxy; a firewall; an anti-malware facility; and a virus detection facility.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF DRAWINGS

Embodiments of the present disclosure will now be described, by way of example only, with reference to the accompanying drawings, in which:

FIG. 3 is a flowchart of a method of feature detection in temporal graph data structures of events in accordance with embodiments of the present disclosure.

DETAILED DESCRIPTION

Figure 1:
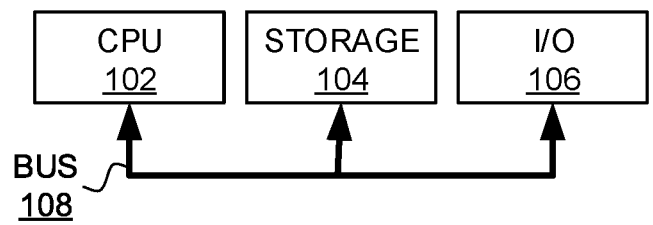
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
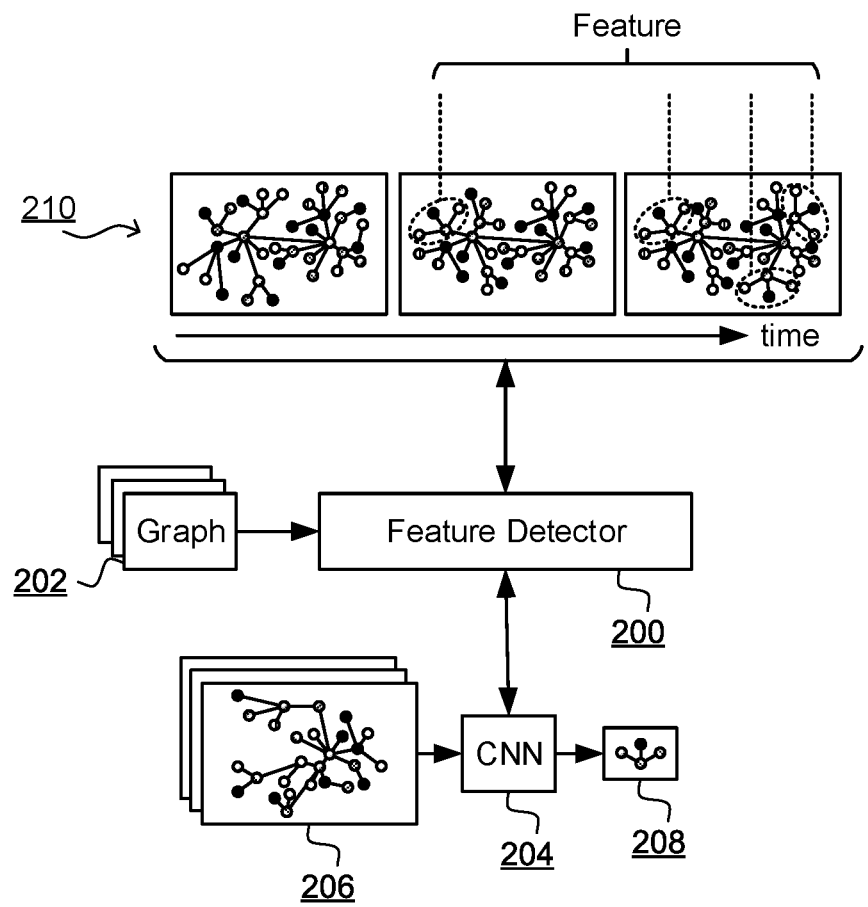
FIG. 2 is a component diagram of an arrangement for feature detection in a temporal series of graph data structures according to embodiments of the present disclosure.

FIG. 2 is a component diagram of an arrangement for feature detection in a temporal series of graph data structures 202 according to embodiments of the present disclosure. A convolutional neural network (CNN) 204 is provided as a deep learning algorithm suitable for being trained based on training images to detect and differentiate features such as aspects and/or objects in images. CNNs are known in the art and are described in, for example: "An Introduction to Convolutional Neural Networks" (O'Shea and Nash, 2015); and "A Comprehensive Guide to Convolutional Neural Networks—the ELIS way" (S. Saha, 2018, available at www.towardsdatascience.com). The CNN 204 is trained to classify temporal series of images, each temporal series including an ordered set of image representations of a graph data structure as it changes over a period of time. The CNN 204 is therefore trained based on a supervised training method including a plurality of training example image series 206. The training example image series 206 includes a plurality of temporal series of image representations of graph data structures including a subset of series for which a feature is known to exist. For example, a training series of images could represent a graph of network traffic for a computer network in which malicious communication is sent and/or received, and thus the training series of images includes features indicative of such malicious communication. Thus, the CNN 204 is trained to detect features of images and classify those features according to one or more features of interest 208.

The feature of interest 208 as depicted in FIG. 1 is a subgraph of a graph data structure represented in an image representation of the graph indicative of a feature occurring in the system modelled by the graph that is notable for recognition in other graphs. While a single feature of interest 208 is illustrated in FIG. 1, and the feature of interest is a subgraph, it will be apparent to those skilled in the art that multiple features of interest can be detected by the trained CNN 204 and each feature of interest can include one or more subgraphs of any size.

The training example image series 206 is generated from training example series of graph data structures. Each image in the image series 206 is rendered based on a graph data structure such that the image represents the graph data structure rendered in a cartesian space as a 2-dimensional or 3-dimensional space. In particular, the rendering of elements of a graph data structure (including nodes and edges) is such that each rendering is preferably reproducible in a cartesian space of the same properties such that images are directly comparable. For example, the algorithm for rendering each image of a graph data structure is common to all rendered images such that each image is reproduced by the algorithm should the image be rendered multiple times. Furthermore, the rendering of elements of a graph data structure in an image representation is based on attributes of nodes and edges in the graph data structure, such as attributes associated with nodes in dependence on the events that the nodes represent, and attributes of edges such as weights or the like. For example, rendering a graph reproducible in a cartesian space can include determining, for each of node and edge elements in the graph: a size of an indication of the element; a location in the space of the element; and visible attributes of the indication of the element in the space, so as to render the indication having the size, at the location and with the visible attributes. Such visible attributes include one or more of: a greyscale; a color; and a brightness.

In this way a temporal sequence of image representations will exhibit changes within the images consistent with changes in a corresponding temporal sequence of graph data structures on which basis the images are generated.

The trained CNN 204 is utilized by a feature detector 200 to detect occurrences of the feature of interest 208 within image representations of temporal graph data structures 202. In this way, detection of a feature—and the attributes of interest of a system for which the feature was generated—within such a visual representation of graph data structures 202 are indicative of existence of such attributes of interest within a system from which the graph data structures 202 were generated.

The feature detector 200 initially renders each of the graph data structures in the temporal sequence of graphs 202 as an image representation 210. As previously described with respect to training images, the image representations 210 are rendered reproducibly in a cartesian space based on attributes of nodes and edges in the graph data structures 202. The rendered image representations 210 are constituted as a series of images ordered temporally according to an order of the temporal series of graph data structures 202.

Subsequently, the feature detector 200 processes the series of image representations 210 of the graph data structures 202 by the CNN 204 so as to detect occurrences of the feature of interest 208 within the images 210. Once detected, the feature of interest 208 and the characteristics of a system of events that it represents can be used to trigger responsive actions in the system.

Notably, the use of a temporal series of images 210 based on temporal series of graph data structures 202 provides for the detection of features across multiple images such as could be achieved for a video or animation based on a series of images. Thus, in one embodiment, the CNN 206 is trained to detect features of interest in a video or animation consisting of multiple frames each constituted by a visual representation of a graph data structure. Thus, the feature of interest 208 can include a particular change or series of changes to one or more subgraphs over multiple images in the temporally ordered image series 210.

An embodiment of the disclosure will now be considered in the field of computer network communication in which each of the training series of images 206 is a visual representation of a graph data structure of networking events occurring within a computer network. For example, such networking events can include: network traffic source, destination and volume; intrusion detection events; security events; or other network events as will be apparent to those skilled in the art. In particular, in the illustrative embodiment, the feature of interest 208 is a learned feature of a visual representation of a graph data structure indicative of (by being associated with) malicious communication in the network.

Accordingly, in the illustrative embodiment, the graph data structures 202 constitute network event graphs that are rendered as visual representations 210 to detect occurrences of the feature of interest 208 therein by the CNN 204. Notably, as depicted in FIG. 2, the feature of interest is identified four times across two of the three visual representations 210. Accordingly, the malicious communication in the network indicated by the feature of interest 208 can be determined to exist in the network for which the event data temporal graph data structures 202 were generated. On detection of such malicious network communication, mitigative and/or remediative measures can be employed including, inter alia: network security protective measures; and network intrusion remediative measures. For example, one or more of a network proxy, firewall, anti-malware or virus detection facility can be deployed.

FIG. 3 is a flowchart of a method of feature detection in temporal graph data structures of events in accordance with embodiments of the present disclosure. Initially, at 302, a temporal series of graph data structures of events 202 is received, each including a plurality of nodes corresponding to events and edges connecting nodes corresponding to relationships between events. At 304, each graph data structure in the series 202 is rendered as an image representation 210 of the graph data structure including a representation of nodes and edges in the graph being rendered reproducibly in a cartesian space. The image representations 210 are rendered based on attributes of the nodes and edges in the graph data structures 202 such that a temporal series of image representations 210 is generated. At 306, the series of image representations 210 is processed by the trained CNN 204 to classify the image series 210 so as to identify a feature of interest 208 in the image series.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present claims includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of feature detection in temporal graph data structures of events, the method comprising:
    receiving a temporal series of graph data structures of events each including a plurality of nodes corresponding to events and edges connecting the nodes corresponding to relationships between events;
    rendering each graph data structure in the temporal series as an image representation of the graph data structure including a representation of the nodes and the edges in the graph data structure being rendered reproducibly in a cartesian space based on attributes of the nodes and the edges, so as to generate a temporal series of image representations ordered according to the temporal graph data structures; and
    processing the temporal series of image representations by a convolutional neural network to classify the temporal series of image representations so as to identify a feature in the temporal series of image representations, the convolutional neural network being trained by a supervised training method including a plurality of training example image series in which a subset of the plurality of training example image series are classified as including the feature.

2. The method of claim 1, wherein rendering a graph data structure reproducible in the cartesian space includes determining, for each of the nodes and the edges in the graph data structure: a size of an indication of the node and the edge; a location in the cartesian space of the node and the edge; and visible attributes of the indication of the node and the edge in the cartesian space, so as to render the indication having the size, at the location and with the visible attributes.

3. The method of claim 2, wherein the visible attributes include one or more of: a greyscale; a color; and a brightness.

4. The method of claim 1, wherein the feature is an indication of a subgraph in the temporal series of image representations.

5. The method of claim 1, wherein the feature includes a particular change or a series of changes to a subgraph over images in the temporal series of image representations.

6. The method of claim 1, wherein the events include network communication events for communication across a computer network, and wherein the feature is associated with malicious communication in the computer network.

7. The method of claim 6, wherein identification of the feature in the temporal series of image representations indicates existence of the malicious communication in the computer network, and the method further comprises, responsive to the identification of the feature in the temporal series of image representations, deploying one or more of network security protective measures or network intrusion remediative measures in the computer network.

8. The method of claim 7, wherein the network security protective measures include one or more of: a network proxy; a firewall; an anti-malware facility; or a virus detection facility.

9. A computer system comprising:
    a processor and memory to carry out feature detection in temporal graph data structures of events by:
        receiving a temporal series of graph data structures of events each including a plurality of nodes corresponding to events and edges connecting the nodes corresponding to relationships between events;
        rendering each graph data structure in the temporal series as an image representation of the graph data structure including a representation of the nodes and the edges in the graph data structure being rendered reproducibly in a cartesian space based on attributes of the nodes and the edges, so as to generate a temporal series of image representations ordered according to the temporal graph data structures; and
        processing the temporal series of image representations by a convolutional neural network to classify the temporal series of image representations so as to identify a feature in the temporal series of image representations, the convolutional neural network being trained by a supervised training method including a plurality of training example image series in which a subset of the plurality of training example image series are classified as including the feature.

10. A non-transitory computer-readable storage medium storing a computer program element comprising computer program code to, when loaded into a computer system and executed thereon, cause the computer to perform the method as claimed in claim 1.

* * * * *